Sept. 26, 1944.   O. C. WALLEY   2,359,175
GENERATOR CONTROL MEANS
Filed Dec. 16, 1943
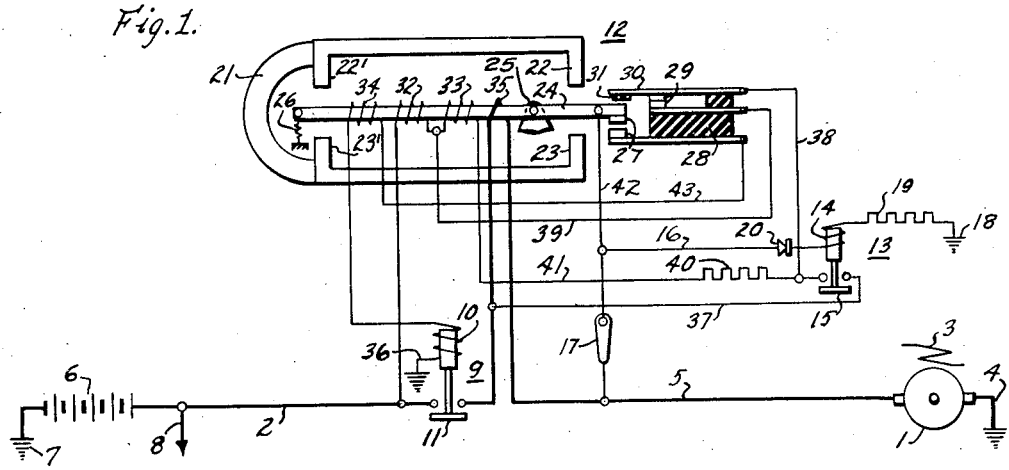
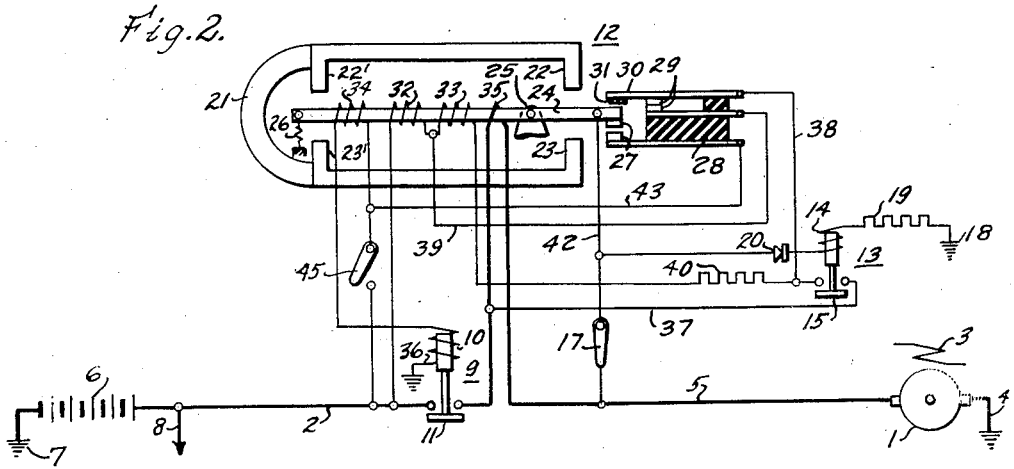
WITNESSES:
Alia L. Howell
F. C. Lyle
INVENTOR
Omar C. Walley.
BY O.B. Buchanan
ATTORNEY

Patented Sept. 26, 1944

2,359,175

UNITED STATES PATENT OFFICE 2,359,175

GENERATOR CONTROL MEANS

Omar C. Walley, Lima, Ohio, assignor to Westinghouse Electric & Manufacturing Company, East Pittsburgh, Pa., a corporation of Pennsylvania Application December 16, 1943, Serial No. 514,522

18 Claims. (Cl. 320—33)

The present invention relates to control means for direct-current generators and, more particularly, to means for controlling the connection of a direct-current generator to a load circuit which includes a battery, or other voltage source.

The control means of the present invention is intended for use in direct-current systems which are supplied by a direct-current generator, and in which a battery is provided to supply the load at times when the generator is not in operation, the battery being charged by the generator when the generator voltage exceeds the battery voltage. In such a system, it is necessary to provide control means for the generator which will connect the generator to the load circuit when its voltage is higher than the battery voltage, or load circuit voltage, and disconnect the generator from the load circuit when its voltage falls below the load circuit voltage so that reverse current tends to flow from the load circuit to the generator. Direct-current systems of this type are commonly used on aircraft, the generator usually being driven by the aircraft engine, and the control means of the present invention is especially adapted for aircraft use, although its usefulness is not necessarily restricted to this particular application, and it is also capable of use in other self-contained systems of the same type, such as are used on certain types of land vehicles.

Control devices for use on aircraft must be of compact design and light weight, and must be capable of relatively simple and rugged construction so as to withstand the effects of severe vibration in use without disturbing their calibration. Aircraft generators have been controlled by means of a voltage-responsive relay which controlled the operation of a contactor to connect the generator to the system when the generator voltage was greater than a predetermined value, which was higher than the battery voltage, the relay also operating to cause the contactor to disconnect the generator in response to reverse current flowing from the system to the generator.

In many cases, however, aircraft electrical systems have two or more generators operating in parallel, and it has been found that the use of generator-voltage-responsive relays in such systems is not satisfactory. This is for the reason that it is extremely difficult to insure that the voltage regulators of the two or more generators have exactly the same setting, and if there is even a slight difference in the voltage regulator settings, the relay and contactor controlling the generator with the lower voltage operate almost continuously. This effect occurs because the relay of the generator with the lower voltage regulator setting will cause it to be connected to the system as soon as its voltage reaches the predetermined value for which the relay is set. The voltage of the generator will be less than the system voltage, however, if the generator with the higher voltage regulator setting is connected to the system, and current will flow from the system to the lower voltage generator. This reverse current will cause the latter generator to be disconnected, but since its voltage is still higher than its relay setting, the relay will immediately cause it to be reconnected and the action just described will be repeated. This continuous operation of the relay and contactor in some cases is so fast that the relay appears to chatter, and the life of the relay and contactor is greatly reduced.

The present invention avoids this difficulty and is suitable for use on systems employing two or more generators, since the control means operates to connect its generator to the system in response to the difference between the generator voltage and the system voltage and, therefore, the generator cannot be connected to the system unless its voltage is higher than the system voltage.

The principal object of the present invention is to provide a control means for connecting a direct-current generator to a load circuit including a battery, or other voltage source, when the generator voltage is higher than the load circuit voltage, and for disconnecting the generator from the load circuit when reverse current flows from the load circuit to the generator, the control means being capable of very sensitive calibration so that it operates to connect the generator to the load circuit in response to a relatively small differential voltage.

Another object of the invention is to provide a control means for a direct-current generator including a polarized relay for controlling the operation of a contactor to connect the generator to a load circuit when the generator voltage is greater than the load circuit voltage by a predetermined amount, which may be quite small, and to disconnect the generator from the load circuit in response to reverse current flowing from the load circuit to the generator, and in which the polarized relay is actuated by a sensitive, low-resistance differential voltage responsive coil, and includes means for protecting the differential voltage coil against high differential voltages during periods when the generator voltage is considerably below the load circuit voltage.

Still another object of the invention is to provide control means for controlling the connection of a direct-current generator to a load circuit including a battery, in which the control means operates in response to the difference in voltage between the generator and the load circuit, and in which the control means will not operate until the generator voltage has reached a substantial predetermined value, and will not operate at all if the polarity of the generator becomes reversed.

A further object of the invention is to provide control means for a direct-current generator including a polarized relay for controlling the operation of a contactor to connect the generator to a load circuit including a battery when the generator voltage is higher than the load circuit voltage, and to disconnect the generator when reverse current flows from the load circuit to the generator, and in which the polarized relay is actuated by a differential voltage responsive coil which is completely deenergized when the generator voltage falls below a predetermined value, so that there is no continuous drain on the battery when the generator is not in operation.

A still further object of the invention is to provide control means for a direct-current generator for connecting the generator to a load circuit which includes a battery when the generator voltage is greater than the load circuit voltage, and for disconnecting the generator when the generator voltage is less than the load circuit voltage, and in which means are also provided for connecting the battery directly to the generator so that the generator can be used as a starting motor for starting its prime mover.

The invention will be more fully understood from the following detailed description, taken in conjunction with the accompanying drawing, in which:

Figure 1 is a schematic wiring diagram showing a preferred embodiment of the invention; and Fig. 2 is a similar diagram showing a slightly modified embodiment of the invention.

Fig. 1 shows a control means for the control of a direct-current generator 1 which is intended to supply a load circuit 2. The generator may be of any desired type and has been shown diagrammatically. The field winding is indicated at 3, and its excitation is preferably controlled by a voltage regulator, which has not been shown since it is not a part of the present invention. The generator 1 may be driven by any suitable prime mover which, in an aircraft installation, is usually the aircraft engine. One terminal of the generator is grounded, as indicated at 4, and the other terminal is connected to a generator bus 5. The load circuit 2 includes a battery 6, one terminal of the battery being connected to the load circuit and the other terminal grounded at 7. The load circuit also includes a load bus 8 which supplies the load, and to which one or more other generators may be connected for operation in parallel with the generator 1, the connection of these generators to the load circuit being preferably also controlled by control means similar to that shown in Fig. 1. The battery 6 supplies the load bus 8 during periods when the generator 1 is not in operation, or when its voltage is too low to supply the load, and the generator 1 charges the battery when the generator is connected to the load circuit 2.

In many aircraft electrical systems, two or more generators are provided for operation in parallel, and when the load circuit voltage is referred to in this specification it is to be understood as meaning the system voltage as determined either by the battery 6, or by one or more other generators connected to the load bus 8 in the same manner as the generator 1, or by the combination of the battery and one or more such generators. Similarly, when a voltage source connected to the load circuit is referred to, it is to be understood as meaning either a battery, or one or more generators similar to the generator 1, or a combination of batteries and generators.

The control means itself includes a contactor 9 for connecting the generator bus 5 to the load circuit 2. The contactor 9 may be of any suitable type and is shown as having an operating coil 10 and contacts 11. The control means also includes a polarized relay 12 for controlling the operation of the contactor 9, and an auxiliary relay 13.

The auxiliary relay 13 has an operating coil 14 and a contact 15. One end of the operating coil 14 is connected to the generator bus 5 through a conductor 16 and a manual control switch 17. The other end of the coil 14 is connected to ground at 18, preferably in series with a resistor 19. Thus, the relay coil 14 is energized in response to the voltage of the generator 1, and closes the contact 15 when the generator voltage exceeds the pickup voltage of the relay 13. A rectifier 20, or other electric valve device, is connected in series with the relay coil 14 so that current can flow through the coil in one direction but is prevented from flowing through it in the other direction. Thus, if the generator 1 should build up with reversed polarity, the rectifier 20 would prevent any current flow through the coil 14, and the relay 13 would be prevented from operating.

The polarized relay 12 may be of any suitable construction, and has been shown as including a permanent magnet 21 which magnetizes opposed pairs of pole pieces 22 and 23, and 22' and 23'. A magnetizable armature 24 is pivoted at 25 with its ends disposed between the respective pairs of pole pieces, so that the armature 24 is moved about the pivot 25 in one direction or the other when it is magnetized, the direction of movement of the armature 24 depending upon its direction of magnetization. The armature 24 is normally held in its central or non-actuated position, shown in the drawing, by a spring 26. The relay 12 has normally open front contacts 27, one of the contacts 27 being carried on the armature 24, and the cooperating contact being supported in fixed position, as on an insulating block 28. The relay 12 also has normally closed back contacts 29, one of these contacts being fixed in position, and the other one being carried on a spring member 30, which is provided with an insulating button 31 at its end in position to be engaged by the relay armature 24 to open the contacts 29 against the force of the spring 30.

The polarized relay 12 is actuated by means of magnetizing windings or coils arranged to magnetize the relay armature 24 in one direction or the other. For this purpose, the relay armature is provided with a differential voltage responsive coil 32, and an auxiliary voltage coil 33, a holding coil 34, and a current coil 35. These coils may be arranged in any suitable manner, the current coil 35 preferably comprising a single turn of heavy copper strap capable of carrying the full load generator current, and all four of the magnetizing coils are wound so that their effect is additive. The differential voltage coil 32 and the auxiliary voltage coil 33 are connected in series, as shown, and the normally closed back contacts 29 of the relay 12 are connected across the auxiliary coil 33, so that it is short-circuited when these contacts are closed. A resistor 40 is preferably also provided in series with the auxiliary coil 33. The holding coil 34 is connected in series with the front contacts 27 of the relay 12 and the operating coil 10 of the contactor 9, the other end of the coil 10 being connected to ground at 36, so that when the front contacts 27 of the relay close, the holding coil 34 and contactor coil 10 are simultaneously energized. The current coil 35 is connected in series between the generator bus 5 and the contacts 11 of the contactor 9.

The operation of this control means is as follows: When the generator 1 is at rest, with zero voltage, the position of the parts will be as shown in Fig. 1, the contacts 11 of the contactor 9 being open, and the armature 24 of the polarized relay 12 being in its central or non-actuated position. When the generator is started and its voltage starts to rise, current flows through the coil 14 of the auxiliary relay 13 if the manual control switch 17 is closed and the generator 1 has correct polarity. If the generator starts to build up with reversed polarity for any reason, the rectifier 20 will prevent any flow of current through the relay coil 14 and the control means will not operate. When the generator voltage reaches the pickup voltage of the relay 13, the relay is actuated and closes its contact 15. The voltage at which this relay operates is preferably made fairly high in order to prevent any possibility of the generator being connected to the system when its voltage is too low, which might otherwise happen in case the load circuit voltage is also quite low. Thus, for example, the pickup voltage of the relay 13 may be from 16 to 18 volts on a 28 volt system, such as is commonly used on aircraft.

When the relay 13 closes its contact 15, a circuit is completed from the generator bus 5 through the conductor 37, the relay contact 15, conductor 38, back contacts 29 of the relay 12, which are closed at this time, conductor 39 and differential voltage coil 32 to the load circuit 2. Thus, the differential voltage coil 32 is connected directly across the open contacts 11 of the contactor 9, and is energized by the voltage difference between the load circuit 2 and the generator 1. Since the generator voltage at this time is less than the load circuit voltage, current flows through the differential coil 32 in a direction from the load circuit to the generator, and this current flowing in the coil 32 magnetizes the relay armature 24 in such a direction that its ends are attracted towards the pole pieces 22 and 23', respectively, causing the armature to rotate counterclockwise about its pivot 25, and open the back contacts 29. As soon as the back contacts open, the auxiliary voltage coil 33 and resistor 40 are inserted in series with the differential coil 32, the circuit extending from the generator bus 5 through the conductor 37, relay contact 15, resistor 40, conductor 41, auxiliary coil 33, and differential coil 32 to the load circuit 2.

The differential coil 32 is now connected across the open contacts 11 in series with the auxiliary coil 33 and resistor 40, which has the effect of reducing the voltage applied to the differential coil 32 at this time when the differential voltage may be fairly high because the generator voltage is still relatively low, as compared to the load circuit voltage. By reducing the voltage which the differential coil 32 has to withstand, in this manner, it is possible to use a sensitive, low-resistance differential coil which can be accurately calibrated to respond to small voltage differences. The reduction in current through the coil 32 caused by the introduction of the coil 33 and resistor 40 in its circuit reduces the magnetizing effect of the coil 32, but this is compensated for by the additional ampere-turns supplied by the coil 33, so that the relay armature 24 remains sufficiently magnetized to maintain it in its actuated position with the back contacts 29 open.

As the generator voltage continues to increase, the differential voltage across the open contacts 11 decreases, and when the generator voltage becomes approximately equal to the load circuit voltage, the voltage difference across the contacts 11 is substantially zero, so that the differential coil 32 and auxiliary coil 33 are deenergized. This removes the magnetization of the relay armature 24, and it returns to its non-actuated position under the influence of the spring 26, permitting the back contacts 29 to reclose and short-circuit the auxiliary coil 33 and resistor 40, so that the low-resistance differential voltage coil 32 alone is connected across the contacts 11. As previously described, this coil is capable of very sensitive and accurate calibration, and is adapted to cause the relay 12 to respond to relatively low differential voltages. Thus, in a typical 28 volt aircraft system, as mentioned above, the coil 32 may be calibrated to cause operation of the relay 12 on a differential voltage of the order of 0.4 or 0.5 volt.

When the generator voltage exceeds the load circuit voltage, the direction of current flow through the coil 32 is reversed, causing the relay armature 24 to be magnetized in the opposite direction. When the generator voltage exceeds the load circuit voltage by the amount for which the coil 32 is calibrated, the magnetization of the armature 24 becomes strong enough to cause its ends to be attracted to the pole pieces 23 and 22', respectively, so that it rotates in a clockwise direction about the pivot 25 and closes the front contacts 27. Closing of the front contacts of the relay completes a circuit from the generator through the manual control switch 17, the conductor 42, relay contacts 27, conductor 43, holding coil 34, and coil 10 of the contactor 9 to ground. Thus, the holding coil 34 and the contactor coil 10 are simultaneously energized, and the contactor 9 closes its contacts 11 to connect the generator 1 to the load circuit 2. Closing of the contacts 11 short-circuits the differential voltage coil 32 and deenergizes it, but since the holding coil 34 is energized substantially simultaneously with the contactor coil, it maintains the magnetization of the relay armature and keeps the relay 12 in its actuated position with the contacts 27 closed. The device is now in its normal operating condition with the generator 1 supplying current to the load circuit 2.

If the voltage of the generator 1 starts to decrease for any reason, such as slowing down or stopping of its prime mover, and falls below the load circuit voltage, current will flow from the load circuit to the generator, tending to drive it as a motor. This reversal of the current flow through the current coil 35 of the relay 12 produces a magnetizing force tending to reverse the magnetization of the relay armature 24, which is opposed by the magnetizing force of the holding coil 34, which remains in the same direction as before since the coil 34 is energized directly by the generator voltage.

As the generator voltage decreases, the reverse current flowing through the coil 35 increases and the energization of the coil 34 decreases. The coils 34 and 35 are designed so that the magnetizing force produced by the reverse current flowing in the coil 35 overcomes the effect of the coil 34 when a predetermined value of reverse current is reached. This value may, of course, be made as low or as high as desired. As soon as this value of reverse current is reached, the magnetization of the armature 24 is reversed, and it moves counterclockwise about its pivot 25, opening both the front contacts 27 and back contacts 29. Opening of the front contacts 27 interrupts the circuit of the contactor coil 10 and causes the contactor 9 to open, disconnecting the generator 1 from the load circuit. Since the back contacts 29 are also open, the auxiliary coil 33 and resistor 40 are connected in series with the differential voltage coil 32 across the open contacts 11 so that the coil 32 is protected from the relatively high differential voltage. If the generator voltage again rises, the operation of the relay in reconnecting the generator to the load circuit is the same as described above. If the generator voltage continues to decrease, however, when it drops below a pretermined value, the relay 13 drops out and opens its contact 15, deenergizing the relay coils 32 and 33, so that the parts return to their initial position shown in Fig. 1, with the control means completely deenergized.

Fig. 2 shows a slight modification of the invention which is suitable for use where the generator 1 is driven by an auxiliary power plant, or other prime mover which is capable of being started by the generator 1 operating as a motor. This embodiment of the invention is identical with that shown in Fig. 1 and described above, with the addition of a manually operable starting switch 45 connected, as shown, between the load circuit 2 and the conductor 43. It will be apparent that when the switch 45 is closed, a circuit is completed from the load circuit 2 through the switch 45, the coil 34, and the operating coil 10 of the contactor 9 to ground, so that the contactor is energized and closes its contact 11, connecting the generator 1 to the battery 6. The battery then supplies current to the generator and causes it to run as a motor to start its prime mover. As soon as the prime mover has started, the switch 45 is opened and the operation of the control means to connect the generator 1 to the load circuit when the voltage reaches its proper value is exactly the same as described in connection with Fig. 1. The manual control switch 17 is preferably opened when the switch 45 is closed in order to prevent energization of the auxiliary relay 13 from the battery when the contactor 9 closes, and thus to prevent energization of the sensitive relay windings 32 and 33. Thus, this embodiment of the invention provides a simple means for connecting the load circuit to the generator without actuating the relay 12, so that the control means can be used for the purpose of starting the prime mover of the generator in applications where this is possible or desirable.

It should now be apparent that a control means has been provided for controlling the connection of a direct-current generator to a load circuit which has many advantages. The control means response positively and reliably to a small differential voltage to connect the generator to the load circuit as soon as the generator voltage exceeds the load circuit voltage, and responds positively to reverse current to disconnect the generator in response to reverse current of any predetermined magnitude. Another advantage of this control means is that it will operate to connect the generator to the load circuit even when the load circuit voltage is zero, that is, if no battery or other voltage source is connected to the load circuit, or if the battery is dead. If there is any load connected to the load bus 8, the circuit of the differential coil 32 is completed as soon as the relay 13 closes its contact 15, whether there is any other voltage source connected to the load circuit 2 or not. If the load circuit voltage is zero, the relay armature 24 is magnetized in a direction to close the front contacts 27 and effect connection of the generator 1 to the load circuit. This action occurs even with an extremely small load connected to the load bus, since only a very small current in the coil 32 is required to operate the relay 12. If there is no load connected to the load circuit and the load circuit voltage is zero, the circuit of the coil 32 will not be complete and it will not be energized, but under these conditions, there is no occasion to connect the generator to the system.

The new control means permits the use of a differential voltage coil on the relay which has low resistance and which can be made very sensitive, so as to be capable of accurate calibration to cause operation of the relay in response to relatively low differential voltages, which is usually desirable. This result is obtained by the provision of the auxiliary coil 33 and resistor 40, which effect a reduction in the voltage applied to the differential voltage coil during the periods when the differential voltage may be fairly large, and thus the low-resistance differential coil is protected against overheating and need be designed to withstand only relatively low voltages. In this way, the differential voltage coil is positively protected against high voltages but the sensitivity of the relay 12 is not affected since the differential coil alone is used to actuate the relay when the generator voltage starts to exceed the load circuit voltage.

The use of the auxiliary relay 13, with the rectifier 20, is also an important feature of the invention. The rectifier prevents operation of the relay 13 and, therefore, prevents energization of the coils of the relay 12, in case the generator 1 should build up with reversed polarity. If the rectifier were not used, the coils of the relay 12 would have to be designed to withstand a maximum voltage equal to approximately twice the normal generator voltage, which might be applied to the coils if the generator should build up with reversed polarity, and such a design, of course, would result in decreased sensitivity of the relay 12. The use of the auxiliary relay 13 also has another advantage in that it prevents operation of the control means until the generator voltage has reached a reasonably high value, and thus prevents any possibility of the generator being connected to the system when its voltage is too low, which might occur if the load circuit voltage were extremely low and the coils of the relay 12 were not controlled by the auxiliary relay 13. The action of the relay 13 in completely disconnecting the windings of the relay 12 from the system when the generator voltage drops, is also an important advantage since it prevents the continuous drain on the battery which would occur if the differential coil were continuously connected even when the generator voltage had fallen to zero.

A preferred embodiment of the invention has been shown in the drawing and described above for the purpose of illustration, but it is to be understood that various modifications and changes may be made without departing from the spirit of the invention. Thus, a system with ground return has been shown in the drawing, since this type of system is customarily used on aircraft, but the invention is obviously equally applicable to systems having a wire return circuit. Various modifications may also be made in the connections of the system. Thus, the holding coil 34 and the contactor coil 10 might be connected in parallel rather than in series as shown, the essential thing being that they shall be substantially simultaneously energized.

Various other changes and modifications may also be made, and it is to be understood, therefore, that the invention in its broadest aspect is not limited to the precise arrangement shown and described, but includes all equivalent embodiments and modifications which come within the scope of the appended claims.

I claim as my invention:

1. In combination, a direct-current generator, a load circuit including a battery, contact means for connecting the generator to the load circuit, polarized relay means for controlling the operation of said contact means, said polarized relay means including a differential voltage coil and a holding coil, means for connecting said differential voltage coil to be responsive to the difference in voltage between said generator and said load circuit, said differential voltage coil being adapted when the generator voltage is less than the load circuit voltage to cause the polarized relay means to be actuated to effect a reduction in the voltage applied to the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected to be energized by current flowing between the generator and the load circuit, said current-responsive coil being adapted to cause the polarized relay means to be actuated to effect operation of the contact means to disconnect the generator from the load circuit when current of a predetermined magnitude flows from the load circuit to the generator.

2. In combination, a direct-current generator, a load circuit including a battery, contact means for connecting the generator to the load circuit, polarized relay means for controlling the operation of said contact means, said polarized relay means including a differential voltage coil and a holding coil, means for connecting said differential voltage coil across said contact means so as to be responsive to the difference in voltage between said generator and said load circuit, said differential voltage coil being adapted when the generator voltage is less than the load circuit voltage to cause the polarized relay means to be actuated to effect a reduction in the voltage applied to the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected in series with the generator, said current-responsive coil being adapted to cause the polarized relay means to be actuated to effect operation of the contact means to disconnect the generator from the load circuit when current of a predetermined magnitude flows from the load circuit to the generator.

3. In combination, a direct-current generator, a load circuit including a battery, contact means for connecting the generator to the load circuit, polarized relay means for controlling the operation of said contact means, said polarized relay means including a differential voltage coil, an auxiliary voltage coil, and a holding coil, means for connecting said differential voltage coil to be responsive to the difference in voltage between said generator and said load circuit, said differential voltage coil being adapted when the generator voltage is less than the load circuit voltage to cause the polarized relay means to be actuated to effect connection of said auxiliary voltage coil in series with the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected to be energized by current flowing between the generator and the load circuit, said current-responsive coil being adapted to cause the polarized relay means to be actuated to effect operation of the contact means to disconnect the generator from the load circuit when current of a predetermined magnitude flows from the load circuit to the generator.

4. In combination, a direct-current generator, a load circuit including a battery, contact means for connecting the generator to the load circuit, polarized relay means for controlling the operation of said contact means, said polarized relay means including a differential voltage coil, an auxiliary voltage coil, and a holding coil, means for connecting said differential voltage coil across said contact means so as to be responsive to the difference in voltage between said generator and said load circuit, said differential voltage coil being adapted when the generator voltage is less than the load circuit voltage to cause the polarized relay means to be actuated to effect connection of said auxiliary voltage coil in series with the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected in series with the generator, said current-responsive coil being adapted to cause the polarized relay means to be actuated to effect operation of the contact means to disconnect the generator from the load circuit when current of a predetermined magnitude flows from the load circuit to the generator.

5. In combination, a direct-current generator, a load circuit including a battery, contact means for connecting the generator to the load circuit, polarized relay means for controlling the operation of said contact means, said polarized relay means including a differential voltage coil and a holding coil, means for connecting said differential voltage coil to be responsive to the difference in voltage between said generator and said load circuit, auxiliary relay means responsive to the generator voltage for effecting said connection of the differential voltage coil when the generator voltage exceeds a predetermined value, said differential voltage coil being adapted when the generator voltage is less than the load circuit voltage to cause the polarized relay means to be actuated to effect a reduction in the voltage applied to the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected to be energized by current flowing between the generator and the load circuit, said current-responsive coil being adapted to cause the polarized relay means to be actuated to effect operation of the contact means to disconnect the generator from the load circuit when current of a predetermined magnitude flows from the load circuit to the generator.

6. In combination, a direct-current generator, a load circuit including a battery, contact means for connecting the generator to the load circuit, polarized relay means for controlling the operation of said contact means, said polarized relay means including a differential voltage coil and a holding coil, means for connecting said differential voltage coil to be responsive to the difference in voltage between said generator and said load circuit, auxiliary relay means responsive to the generator voltage for effecting said connection of the differential voltage coil when the generator voltage exceeds a predetermined value, means for preventing operation of said auxiliary relay means in case of reversal of polarity of the generator, said differential voltage coil being adapted when the generator voltage is less than the load circuit voltage to cause the polarized relay means to be actuated to effect a reduction in the voltage applied to the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected to be energized by current flowing between the generator and the load circuit, said current-responsive coil being adapted to cause the polarized relay means to be actuated to effect operation of the contact means to disconnect the generator from the load circuit when current of a predetermined magnitude flows from the load circuit to the generator.

7. In combination, a direct-current generator, a load circuit including a battery, contact means for connecting the generator to the load circuit, polarized relay means for controlling the operation of said contact means, said polarized relay means including a differential voltage coil, an auxiliary voltage coil, and a holding coil, means for connecting said differential voltage coil to be responsive to the difference in voltage between said generator and said load circuit, auxiliary relay means responsive to the generator voltage for effecting said connection of the differential voltage coil when the generator voltage exceeds a predetermined value, said differential voltage coil being adapted when the generator voltage is less than the load circuit voltage to cause the polarized relay means to be actuated to effect connection of said auxiliary voltage coil in series with the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected to be energized by current flowing between the generator and the load circuit, said current-responsive coil being adapted to cause the polarized relay means to be actuated to effect operation of the contact means to disconnect the generator from the load circuit when current of a predetermined magnitude flows from the load circuit to the generator.

8. In combination, a direct-current generator, a load circuit including a battery, contact means for connecting the generator to the load circuit, polarized relay means for controlling the operation of said contact means, said polarized relay means including a differential voltage coil, an auxiliary voltage coil, and a holding coil, auxiliary relay means responsive to the generator voltage for effecting connection of said differential voltage coil across said contact means when the generator voltage exceeds a predetermined value, whereby the differential voltage coil is energized in response to the difference in voltage between the generator and the load circuit, said differential voltage coil being adapted when the generator voltage is less than the load circuit voltage to cause the polarized relay means to be actuated to effect connection of said auxiliary voltage coil in series with the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected in series with the generator, said current-responsive coil being adapted to cause the polarized relay means to be actuated to effect operation of the contact means to disconnect the generator from the load circuit when current of a predetermined magnitude flows from the load circuit to the generator.

9. In combination, a direct-current generator, a load circuit including a battery, contact means for connecting the generator to the load circuit, polarized relay means for controlling the operation of said contact means, said polarized relay means including a differential voltage coil, an auxiliary voltage coil, and a holding coil, auxiliary relay means responsive to the generator voltage for effecting connection of said differential voltage coil across said contact means when the generator voltage exceeds a predetermined value, whereby the differential voltage coil is energized in response to the difference in voltage between the generator and the load circuit, means for preventing operation of said auxiliary relay means in case of reversal of polarity of the generator, said differential voltage coil being adapted when the generator voltage is less than the load circuit voltage to cause the polarized relay means to be actuated to effect connection of said auxiliary voltage coil in series with the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected in series with the generator, said current-responsive coil being adapted to cause the polarized relay means to be actuated to effect operation of the contact means to disconnect the generator from the load circuit when current of a predetermined magnitude flows from the load circuit to the generator.

10. In combination, a direct-current generator, a load circuit including a battery, contact means for connecting the generator to the load circuit, polarized relay means for controlling the operation of said contact means, said polarized relay means including a differential voltage coil and a holding coil, means for connecting said differential voltage coil to be responsive to the difference in voltage between said generator and said load circuit, said differential voltage coil being adapted when the generator voltage is less than the load circuit voltage to cause the polarized relay means to be actuated to effect a reduction in the voltage applied to the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected to be energized by current flowing between the generator and the load circuit, said current-responsive coil being adapted to cause the polarized relay means to be actuated to effect operation of the contact means to disconnect the generator from the load circuit when current of a predetermined magnitude flows from the load circuit to the generator, and means for effecting connection of the load circuit to the generator independently of the operation of the polarized relay means.

11. In combination, a direct-current generator, a load circuit including a battery, contact means for connecting the generator to the load circuit, polarized relay means for controlling the operation of said contact means, said polarized relay means including a differential voltage coil and a holding coil, means for connecting said differential voltage coil to be responsive to the difference in voltage between said generator and said load circuit, said differential voltage coil being adapted when the generator voltage is less than the load circuit voltage to cause the polarized relay means to be actuated to effect a reduction in the voltage applied to the differential voltage coil, and said differential voltage coil being adapted when the generator voltage is greater than the load circuit voltage by a predetermined amount to cause the polarized relay means to be actuated to effect operation of said contact means to connect the generator to the load circuit and to effect energization of said holding coil to maintain the polarized relay means in its actuated position, said polarized relay means also including a current-responsive coil connected to be energized by current flowing between the generator and the load circuit, said current-responsive coil being adapted to cause the polarized relay means to be actuated to effect operation of the contact means to disconnect the generator from the load circuit when current of a predetermined magnitude flows from the load circuit to the generator, and manually operable means for effecting operation of said contact means to connect the load circuit to the generator independently of the operation of the polarized relay means.

12. Control means for controlling the connection of a direct-current generator to a load circuit including another voltage source, said control means comprising switch means for connecting the generator to the load circuit, a polarized relay for controlling the operation of the switch means, said polarized relay having a differential voltage coil, a holding coil and a current coil, means for connecting said differential voltage coil across said switch means so as to be responsive to the difference in voltage between the generator and the load circuit, the differential voltage coil being adapted when the voltage on the load circuit side of the switch means is greater than the voltage on the generator side to cause actuation of the polarized relay to effect a reduction in the voltage applied to the differential voltage coil, and the differential voltage coil being adapted when the voltage on the generator side of the switch means is greater than the voltage on the load circuit side by a predetermined amount to cause actuation of the polarized relay to effect operation of the switch means to closed position and substantially simultaneous energization of said holding coil to maintain the polarized relay in its actuated position, said current coil being connected to be energized by current flowing through the switch means and being adapted to cause actuation of the polarized relay to effect opening of the switch means in response to current of a predetermined magnitude flowing from the load circuit to the generator.

13. Control means for controlling the connection of a direct-current generator to a load circuit including another voltage source, said control means comprising switch means for connecting the generator to the load circuit, a polarized relay for controlling the operation of the switch means, said polarized relay having a differential voltage coil, an auxiliary voltage coil, a holding coil and a current coil, means for connecting said differential voltage coil across said switch means so as to be responsive to the difference in voltage between the generator and the load circuit, the differential voltage coil being adapted when the voltage on the load circuit side of the switch means is greater than the voltage on the generator side to cause actuation of the polarized relay to effect connection of said auxiliary voltage coil in series with the differential voltage coil, and the differential voltage coil being adapted when the voltage on the generator side of the switch means is greater than the voltage on the load circuit side by a predetermined amount to cause actuation of the polarized relay to effect operation of the switch means to closed position and substantially simultaneous energization of said holding coil to maintain the polarized relay in its actuated position, said current coil being connected to be energized by current flowing through the switch means and being adapted to cause actuation of the polarized relay to effect opening of the switch means in response to current of a predetermined magnitude flowing from the load circuit to the generator.

14. Control means for controlling the connection of a direct-current generator to a load circuit including another voltage source, said control means comprising switch means for connecting the generator to the load circuit, a polarized relay for controlling the operation of the switch means, said polarized relay having a differential voltage coil, an auxiliary voltage coil, a holding coil, and a current coil, an auxiliary relay responsive to the generator voltage for connecting said differential voltage coil across said switch means when the generator voltage exceeds a predetermined value, means for preventing operation of the auxiliary relay in case of reversal of polarity of the generator, the differential voltage coil being adapted when the voltage on the load circuit side of the switch means is greater than the voltage on the generator side to cause actuation of the polarized relay to effect connection of said auxiliary voltage coil in series with the differential voltage coil, and the differential voltage coil being adapted when the voltage on the generator side of the switch means is greater than the voltage on the load circuit side by a predetermined amount to cause actuation of the polarized relay to effect operation of the switch means to closed position and substantially simultaneous energization of said holding coil to maintain the polarized relay in its actuated position, said current coil being connected to be energized by current flowing through the switch means and being adapted to cause actuation of the polarized relay to effect opening of the switch means in response to current of a predetermined magnitude flowing from the load circuit to the generator.

15. Control means for controlling the connection of a direct-current generator to a load circuit including another voltage source, said control means comprising switch means for connecting the generator to the load circuit, a polarized relay for controlling the operation of the switch means, said polarized relay having a differential voltage coil, an auxiliary voltage coil, a holding coil, and a current coil, and said polarized relay having normally open front contacts and normally closed back contacts, said differential voltage coil and said auxiliary voltage coil being connected in series and said normally closed back contacts of the polarized relay being connected across the auxiliary voltage coil to short-circuit it, an auxiliary relay responsive to the generator voltage, said auxiliary relay being adapted to connect the differential voltage coil and the short-circuited auxiliary voltage coil across said switch means when the generator voltage exceeds a predetermined value, said differential voltage coil being adapted when the load circuit voltage is greater than the generator voltage to cause actuation of the polarized relay to open its back contacts, whereby the auxiliary voltage coil is inserted in series with the differential voltage coil across the switch means, and the differential voltage coil being adapted when the generator voltage is greater than the load circuit voltage by a predetermined amount to cause actuation of the polarized relay to close its front contacts, said front contacts being connected to complete a control circuit for energizing said holding coil and for effecting closing of the switch means to connect the generator to the load circuit, and said current coil being connected in series with the switch means and being adapted to cause actuation of the polarized relay to open its front contacts and effect opening of the switch means in response to current of a predetermined magnitude flowing from the load circuit to the generator.

16. Control means for controlling the connection of a direct-current generator to a load circuit including another voltage source, said control means comprising switch means for connecting the generator to the load circuit, a polarized relay for controlling the operation of the switch means, said polarized relay having a differential voltage coil, an auxiliary voltage coil, a holding coil, and a current coil, and said polarized relay having normally open front contacts and normally closed back contacts, said differential voltage coil and said auxiliary voltage coil being connected in series and said normally closed back contacts of the polarized relay being connected across the auxiliary voltage coil to short-circuit it, an auxiliary relay responsive to the generator voltage, means for preventing energization of said auxiliary relay in case of reversal of polarity of the generator, said auxiliary relay being adapted to connect the differential voltage coil and the short-circuited auxiliary voltage coil across said switch means when the generator voltage exceeds a predetermined value, said differential voltage coil being adapted when the load circuit voltage is greater than the generator voltage to cause actuation of the polarized relay to open its back contacts, whereby the auxiliary voltage coil is inserted in series with the differential voltage coil across the switch means, and the differential voltage coil being adapted when the generator voltage is greater than the load circuit voltage by a predetermined amount to cause actuation of the polarized relay to close its front contacts, said front contacts being connected to complete a control circuit for energizing said holding coil and for effecting closing of the switch means to connect the generator to the load circuit, and said current coil being connected in series with the switch means and being adapted to cause actuation of the polarized relay to open its front contacts and effect opening of the switch means in response to current of a predetermined magnitude flowing from the load circuit to the generator.

17. Control means for controlling the connection of a direct-current generator to a load circuit including another voltage source, said control means comprising switch means for connecting the generator to the load circuit, a polarized relay for controlling the operation of the switch means, said polarized relay having a differential voltage coil, an auxiliary voltage coil, a holding coil, and a current coil, and said polarized relay having normally open front contacts and normally closed back contacts, said differential voltage coil and said auxiliary voltage coil being connected in series and said normally closed back contacts of the polarized relay being connected across the auxiliary voltage coil to short-circuit it, an auxiliary relay responsive to the generator voltage, means for preventing energization of said auxiliary relay in case of reversal of polarity of the generator, said auxiliary relay being adapted to connect the differential voltage coil and the short-circuited auxiliary voltage coil across said switch means when the generator voltage exceeds a predetermined value, said differential voltage coil being adapted when the load circuit voltage is greater than the generator voltage to cause actuation of the polarized relay to open its back contacts, whereby the auxiliary voltage coil is inserted in series with the differential voltage coil across the switch means, and the differential voltage coil being adapted when the generator voltage is greater than the load circuit voltage by a predetermined amount to cause actuation of the polarized relay to close its front contacts, said front contacts being connected to complete a control circuit for energizing said holding coil and for effecting closing of the switch means to connect the generator to the load circuit, and said current coil being connected in series with the switch means and being adapted to cause actuation of the polarized relay to open its front contacts and effect opening of the switch means in response to current of a predetermined magnitude flowing from the load circuit to the generator, and manually operable means for effecting closing of the switch means independently of the operation of the polarized relay.

18. Control means for controlling the connection of a direct-current generator to a load circuit including another voltage source, said control means comprising switch means for connecting the generator to the load circuit, a polarized relay for controlling the operation of the switch means, said polarized relay having a differential voltage coil, an auxiliary voltage coil, a holding coil, and a current coil, and said polarized relay having normally open front contacts and normally closed back contacts, said differential voltage coil and said auxiliary voltage coil being connected in series and said normally closed back contacts of the polarized relay being connected across the auxiliary voltage coil to short-circuit it, an auxiliary relay responsive to the generator voltage, means for preventing energization of said auxiliary relay in case of reversal of polarity of the generator, said auxiliary relay being adapted to connect the differential voltage coil and the short-circuited auxiliary voltage coil across said switch means when the generator voltage exceeds a predetermined value, said differential voltage coil being adapted when the load circuit voltage is greater than the generator voltage to cause actuation of the polarized relay to open its back contacts, whereby the auxiliary voltage coil is inserted in series with the differential voltage coil across the switch means, and the differential voltage coil being adapted when the generator voltage is greater than the load circuit voltage by a predetermined amount to cause actuation of the polarized relay to close its front contacts, said front contacts being connected to complete a control circuit for energizing said holding coil and for effecting closing of the switch means to connect the generator to the load circuit, and said current coil being connected in series with the switch means and being adapted to cause actuation of the polarized relay to open its front contacts and effect opening of the switch means in response to current of a predetermined magnitude flowing from the load circuit to the generator, and manually operable means for energizing said control circuit from the load circuit to effect closing of the switch means independently of the operation of the polarized relay.

OMAR C. WALLEY.